UNITED STATES PATENT OFFICE.

LOUIS ENRICHT, OF NEW YORK, N. Y., ASSIGNOR TO THE ENRICHT MANUFACTURING COMPANY, OF SAME PLACE.

ARTIFICIAL STONE OR CEMENT.

SPECIFICATION forming part of Letters Patent No. 448,513, dated March 17, 1891.

Application filed May 16, 1890. Serial No. 352,071. (No specimens.)

*To all whom it may concern:*

Be it known that I, LOUIS ENRICHT, a citizen of the United States, residing at New York, in the county and State of New York, have invented new and useful Improvements in Artificial Stone or Cement, of which the following is a specification.

This invention relates to a composition of matter serviceable for use as artificial stone or cement, as set forth in the following specification and claim.

The composition consists of the following ingredients: sulphate of magnesium, eight ounces; water, about ten ounces; magnesium oxide, twenty-six ounces.

In practice I dissolve the sulphate of magnesium in the water before adding the magnesium oxide. The water is used to dissolve the sulphate of magnesium, and for this purpose I use sufficient water to effect such solution. An excess of water is not objectionable, since in the case of such excess the composition merely requires a somewhat longer time to set or dry. I have found that about ten ounces of water to about eight ounces of sulphate of magnesium, as above stated, gives satisfactory results.

In the production of my composition the sulphate of magnesium enters into chemical combination with the magnesium oxide and water and forms an oxysulphate of magnesium, which on drying becomes a very hard cement or stone.

If the compound is to be used as cement, it must be used while still in its wet or plastic state.

If the mixture is to be made into stone, it is molded or shaped into the required form and allowed to dry or set.

What I claim as new, and desire to secure by Letters Patent, is—

The herein-described composition of matter to be used for stone or cement, consisting of sulphate of magnesium, water, and magnesium oxide, substantially in the proportions specified.

In testimony whereof I have hereunto set my hand in the presence of two subscribing witnesses.

LOUIS ENRICHT.

Witnesses:
 WM. C. HAUFF,
 E. F. KASTENHUBER.